UNITED STATES PATENT OFFICE.

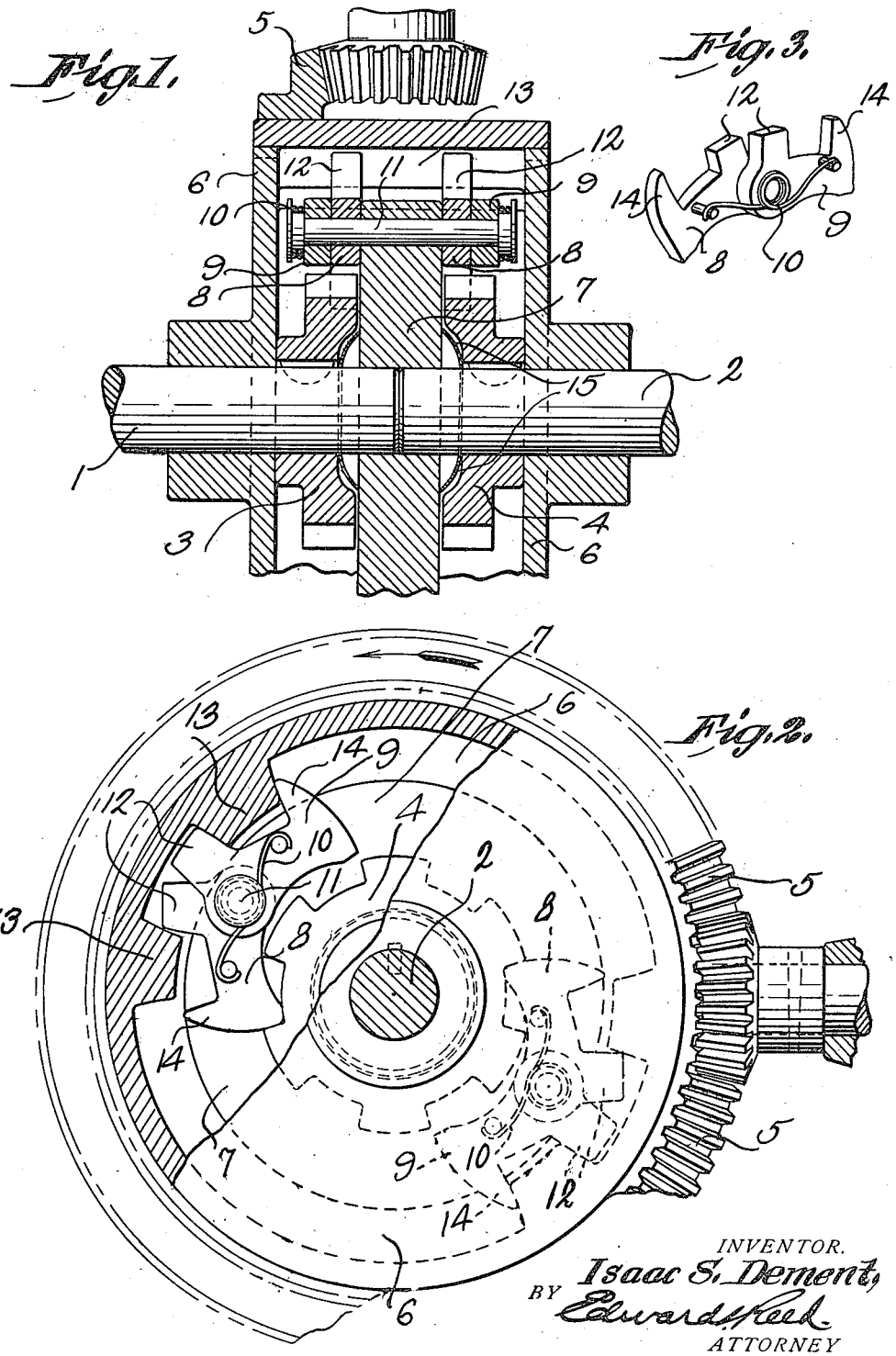

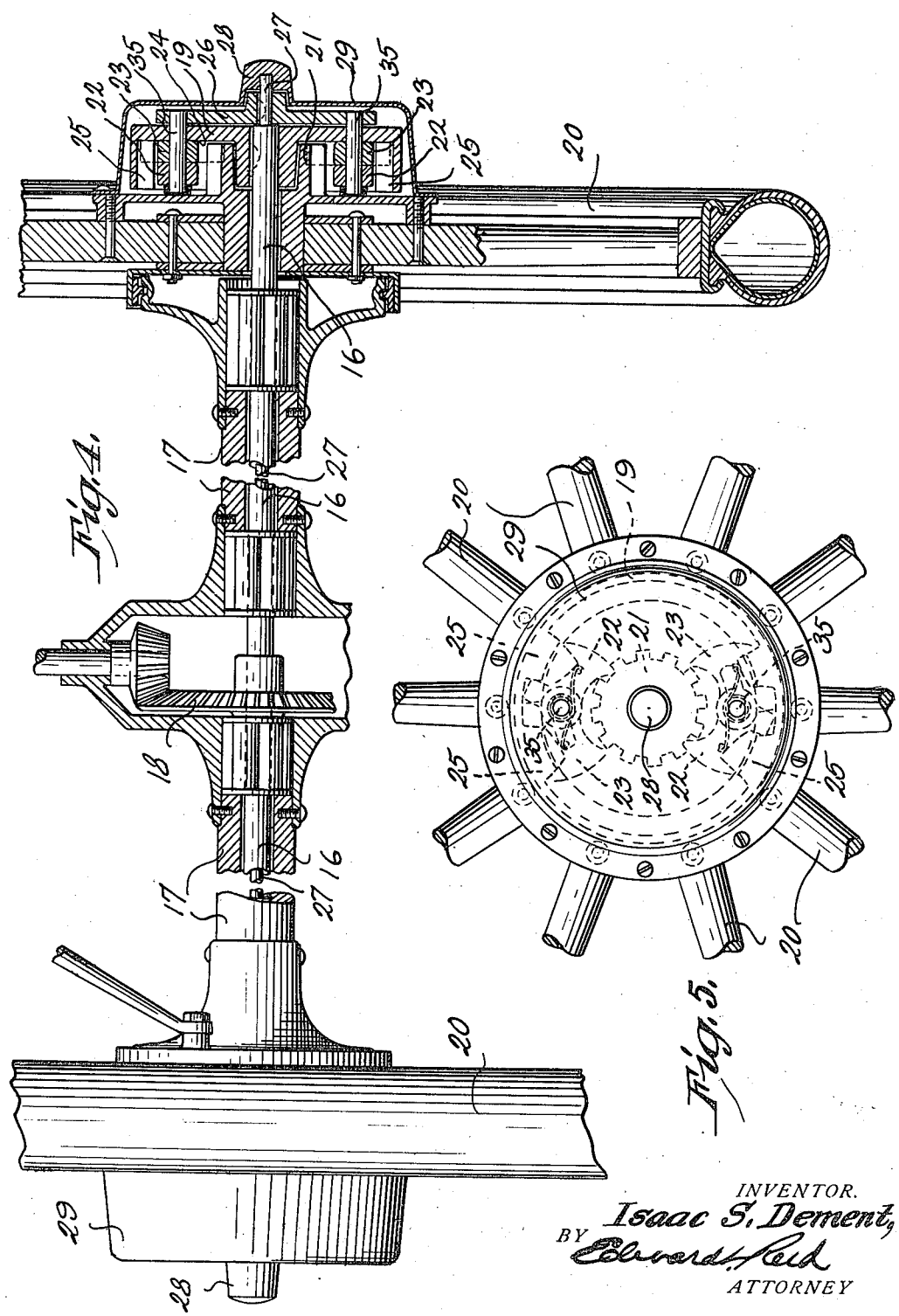

ISAAC S. DEMENT, OF DAYTON, OHIO, ASSIGNOR OF ONE-HALF TO JOHN COLLINS, OF DAYTON, OHIO.

DRIVING MECHANISM.

1,275,158.           Specification of Letters Patent.           Patented Aug. 6, 1918.

Application filed November 19, 1917. Serial No. 202,729.

*To all whom it may concern:*

Be it known that I, ISAAC S. DEMENT, a citizen of the United States, residing at Dayton, in the county of Montgomery and State of Ohio, have invented certain new and useful Improvements in Driving Mechanism, of which the following is a specification, reference being had therein to the accompanying drawing.
This invention relates to driving mechanism, and is designed more particularly to take the place of the compensating gearing usually employed on motor driven vehicles, and the like, to permit one driven member, or driving wheel, to rotate at a speed greater than the speed of the other driven member. The present invention is an improvement on the device shown and described in Patent No. 1,235,538, granted to me July 31, 1917, and has for its object the production of a device which will accomplish the results of the device of that patent, and which will be very simple in its construction, positive in its operation and of a strong durable character.
A further object of the invention is to provide such a device with means to prevent the movement of one driven member in advance of the other one from causing the rear pawl to be moved into operative relation to its driven member; and to this end it is also an object of the invention to provide means for locking the rear or idle pawl in its inoperative position. Further, it is an object of the invention to provide a device of this kind which can be readily applied either to a two piece axle, as in the manner of the ordinary compensating gearing, or to a one piece axle, in which the mechanism is arranged at the ends of the axle and connected directly with the driving wheels. Other objects will appear as the invention is described in detail.

In the accompanying drawings Figure 1 is a sectional view of the upper portion of a mechanism embodying my invention; Fig. 2 is a side elevation of such a mechanism with the casing partly broken away; Fig. 3 is a detail view of one pair of pawls; Fig. 4 is a plan view, partly in section of a one piece axle showing the invention applied thereto;
and Fig. 5 is a side elevation of one of the wheels of Fig. 4, partly broken away.

In these drawings I have illustrated one embodiment of my invention and have shown this embodiment of the invention as applied, first, to a divided rear axle of an automobile in substantially the same position as the ordinary compensating gearing is applied; and second, to a one piece axle in which the driving mechanism is arranged at the ends of the axle and connected at the ends with the respective driving wheels. The mechanism in both instances is substantially the same, there being only certain minor changes in the form and arrangement of the parts to adapt them to the different types of axle.

In Figs. 1 and 2 I have shown the mechanism as applied to a two part axle, the two parts of which constitute the driven members of the mechanism and are indicated by the reference numerals 1 and 2. Both driven members are provided with teeth, preferably by securing ratchet wheels, 3 and 4, to the adjacent ends of the respective members. A suitable driving member, such as the gear 5 is mounted for rotation about the common axis of the driven members and is connected with a suitable source of power, such as the driving shaft of an automobile. This driving member may be supported in various ways, but in the present instance I have shown the same as rigidly secured to a casing 6, which forms part of the driving member, and which has its two side walls rotatably mounted upon the respective driven members, so that the toothed members 3 and 4 are arranged within the casing. I have, in the present instance, shown the casing as a closed casing, but it will be understood that it can be open, or in the form of a supporting frame, and still accomplish all the functions necessary. Power is transmitted from the driving member to the driven members through suitable connecting devices which are, in the present construction, in the form of pawls adapted to coöperate with the toothed driven members. I employ two pairs of pawls, the pawls of each pair extending in opposite directions and the two pairs of pawls being arranged to coöperate with the respective toothed driven members. These pawls may be supported in their proper relations to the respective toothed members in any suitable manner, but I have here shown both pairs of pawls as carried by a pawl supporting device 7, which is rotatable about the common axis of the two driven members, and is here shown as mounted upon and overlapping the ends of the two parts of the axle. The pawls of each pair, which are here indicated by the reference numerals 8 and 9, respectively, are acted upon by a spring 10, which tends to move them into operative relation to the corresponding toothed member, and if the pawls were uncontrolled the nose of each would engage the toothed member. The two pawls of each pair may be mounted upon the pawl carrying device 7 in any suitable manner, but I prefer to mount them for rotation about a common axis and I have shown the two pairs of pawls as mounted upon the respective ends of a pin 11 which extends through the pawl carrying member and beyond the sides thereof sufficient distances to receive the respective pairs of pawls. When so mounted the pawls may be separately rocked about the axis of the pin 11 to move them into and out of operative relation to the respective toothed members.

Each pawl has an outwardly extending projection, or finger, 12, which is arranged to be engaged by a part of the driving member, this part being, in the present instance, in the form of an inwardly extending projection, or transverse rib, 13, which extends across the casing of the driving member and is adapted to act simultaneously upon the projection, or finger, 12, of the corresponding pawls of each pair of pawls. When the driving member is rotated in one direction, say to the left in Fig. 2, the projection 13 will engage the projections 12 of the rear pawls of each pair and will move those pawls away from the toothed driven members into the positions shown in Fig. 2. The movement of the rear pawls about their axes compresses the springs 10 and facilitates the movement of the forward pawls into their operative positions. The movement of the rear pawl when acted upon by the driving member continues until the outwardly moving part thereof comes into engagement with the driving member, thus checking the movement of the pawl and forming a rigid connection between the pawl and the driving member, and causing the power to be transmitted from the driving member through the rear pawl and the pin 11 to the forward pawl, and thence to the driven member. When the two pawls are held in the positions shown in Fig. 2 they constitute a rigid connection between the driving member and the driven member. The forward pawl is yieldable, however, to permit the driven member to run ahead of the driving member. When the driving member is moved in the opposite direction the pawl 8 becomes the rearward pawl and is acted upon by the corresponding projection, or rib, 13 of the driving member to move it into an inoperative position and to cause the pawl 9 to be moved into operative engagement with the toothed member, the projection 13 which had been in engagement with the pawl 9 having been moved away therefrom.

It will be noted that the two pairs of pawls are held positively against bodily movement relatively one to the other. Consequently when one toothed member runs ahead of the other there is no possibility of the pawls being carried bodily forward with the toothed member so as to change their positions relatively thereto and to cause the rear pawl to be moved into a position to be engaged by said toothed member. While this arrangement is ordinarily sufficient to accomplish the purpose, I have also provided in the present construction a second device which may be used either with, or independently of, the construction by means of which the two pairs of pawls are tied together. When this second device is utilized each pawl is provided with an outwardly extending projection, or finger, 14, adapted to be moved into engagement with a part of the driving member, in the present instance the rear edge of the projection, or rib 13, which engagement offers a frictional resistance to the movement of the pawl toward the toothed member so long as the rib is in operative engagement with the projection 12 of the pawl. It is, of course, necessary that there should be sufficient drag upon the pawl carrying member to cause the pawls to be rocked about their axes when they are engaged by the projection 13 of the driving member. While the ordinary frictional resistance to the movement of this device will usually be sufficient to accomplish this purpose I have, in the present construction, inserted dish-shaped springs 15 between the pawl carrying device and the toothed members, which will offer the necessary resistance to the movement of the pawl carrying device, and will at the same time allow the toothed members to rotate freely relatively thereto.

The operation of the device will be readily understood from the foregoing description and it will be apparent that the mechanism is very simple in its construction; that it comprises but a few parts; and that these parts are of such a character that they may be very strong and durable. Further, it will be apparent that the manner of operating the pawls is such as to render their operation positive and to cause the same to be accomplished very quickly. Moreover the construction is such that there is little or no possibility of any of the pawls being moved into their operative positions at the wrong time.

In Figs. 4 and 5 I have shown the mechanism as applied to a one piece axle. In making this application the same parts are employed and their operation is the same as that above described, but they are changed in form and arrangement to adapt them to the different type of axle. The axle which is shown in Fig. 4 at 16 is mounted in the usual housing 17, and has secured thereto a driving gear 18 which is adapted to receive power from the driving shaft of the machine. This one piece axle 16 constitutes the driving member of the machanism and has at each end a disk-like part 19 which serves to transmit power through the pawls as above described, to the toothed portions of the driven members. In this construction the driving wheels 20 are rotatably mounted on the housing 17 and constitute the driven members of the mechanism, and are provided with ratchet wheels 21 with which coöperate pawls 22 and 23. These pawls are mounted in a recess 24 formed in the disk-like end portion of the driving member and are of substantially the same construction and arrangement as the pawls 8 and 9 above described. The driving member has an inwardly extending projection, or rib, 25, to engage the outwardly extending projections on the pawls and causing them to operate in the described manner. While the pawls may be mounted in any suitable manner I have in this construction also carried out the idea of rigidly connecting the pawls of the two pairs so that they can have no bodily movement relatively one to the other. To accomplish this I have mounted the pin 35 which carries the pawls in a pawl carrying device, which comprises plates 26 mounted adjacent to the respective end portions of the driving member and connected one to the other by means of a rod, or shaft, 27, extending through the hollow axle 16 and mounted at its ends in bearings 28 formed in the casing 29, which incloses the mechanism on each wheel. The part 19 is slotted to receive the pin 35 and permit it to have movement relatively thereto.

It will be noted that by the use of this type of driving mechanism a full floating rear axle may be had and the driven wheels will be capable of the relative movement necessary to compensate for any inequality in the distance traveled by the respective wheels. It will also be noted that while I have described one set of pawls in each form of the device, two or more sets may be used, and that I have illustrated in each form of the device two sets of pawls arranged on opposite sides of the respective driven members.

While I have shown and described one embodiment of my invention I wish it to be understood that I do not desire to be limited to the details of construction as obvious modifications will occur to a person skilled in the art.

Having now fully described my invention, what I claim as new and wish to secure by Letters Patent is:

1. The combination with a toothed driven member and a driving member, of a pair of oppositely arranged pawls supported adjacent to said driven member and having projections arranged to be respectively engaged by parts of said driving member to actuate said pawls.

2. The combination with a toothed driven member and a driving member, of a pair of oppositely arranged pawls supported adjacent to said driven member and each having a part rigidly secured thereto and arranged to be engaged by a part of said driving member to actuate said pawls.

3. The combination with a toothed driven member and a driving member, of a pair of oppositely arranged pawls supported adjacent to said driven member and each having a part extending outwardly from the axis thereof into the path of a part of said driving member.

4. The combination with a toothed driven member and a driving member, of a pair of oppositely arranged pawls supported adjacent to said driven member and having parts arranged to be respectively engaged by parts of said driving member, said parts of said driving member being so arranged that when said driving member is moved in one direction one pawl will be moved into its inoperative position, and when said driving member is moved in the opposite direction the other pawl will be moved into its inoperative position, and a connection between said pawls to cause power to be transmitted from said driving member through the inoperative pawl to the operative pawl and the driven member.

5. The combination with a toothed driven member and a driving member, of a pair of oppositely arranged pawls supported adjacent to said driven member and connected one with the other, said driving member having means for engaging one of said pawls to move it into its inoperative position and to transmit power through said pawl to the other pawl and said driven member.

6. The combination with a toothed driven member, of a pair of oppositely arranged pawls, a device for supporting said pawls adjacent to said driven member and for connecting the same one to the other, and a driving member having a part arranged to engage the rearward pawl and move the same into its inoperative position and transmit power through said rearward pawl and said supporting device to the forward pawl to said driven member.

7. The combination with a toothed member and a driving member, of a pair of oppositely arranged pawls, a pin upon which both of said pawls are pivotally mounted, said driving member having a part arranged to engage the rearward pawl to move the same out of engagement with said driven member and to then check the pivotal movement of said pawl and to cause power to be transmitted through the same and its supporting pin to the forward pawl and said driven member.

8. The combination with a toothed member and a driving member, of a pair of oppositely arranged pawls, a pin upon which both of said pawls are pivotally mounted, said driving member having a part arranged to engage the rearward pawl to move the same out of engagement with said driven member and to then check the movement of said pawl and to cause power to be transmitted through the same and its supporting pin to the forward pawl and said driven member, said rearward pawl and said driving member having coöperating parts to hold said pawl in its inoperative position.

9. The combination with a toothed driven member and a driving member, of a pair of oppositely arranged pawls, a device for supporting said pawls adjacent to said driven member, each of said pawls being separately movable toward and from said driven member, and a spring tending to move said pawls toward said driven member, said driving member having a part arranged to engage the rearward pawl, to move the same into an inoperative position and to transmit power through said rearward pawl and said supporting device to the forward pawl and said driven member.

10. The combination with a toothed driven member and a driving member, of a pair of oppositely arranged pawls, a device for supporting said pawls adjacent to said driven member, each of said pawls being separably movable toward and from said driven member, and a spring tending to move said pawls toward said driven member, said driving member having a part arranged to engage the rearward pawl, to move the same into an inoperative position and to transmit power through said rearward pawl and said supporting device to the forward pawl and said driven member, said rearward pawl having near its free end a projection adapted to be moved into engagement with a part of said driving member to retain said pawl in its inoperative position.

11. The combination with two toothed driven members and a driving member, of two pairs of oppositely arranged pawls supported adjacent to the respective driven members, means for holding each pair of pawls against bodily movement relatively to the other pair of pawls, the pawls of each pair being separably movable into and out of engagement with the respective toothed driven members, said pawls having parts arranged to be engaged by said driving member to move the rearward pawls of each pair into inoperative positions and to transmit power through the rearward pawls to the forward pawls and the driven members.

12. The combination with two toothed driven members and a driving member, of two pairs of oppositely arranged pawls, a pawl supporting device to support said pairs of pawls adjacent to the respective driven members and to hold the same against bodily movement relatively one to the other, said pawls and said driving member having coöperating parts whereby the movement of said driving member will cause the rearward pawls to be moved into inoperative positions and power will be transmitted from the driving member through the rearward pawls to the forward pawls and the respective driven members.

13. The combination with two toothed driven members and a driving member, of two pairs of oppositely arranged pawls, a pawl supporting device arranged between said driven members and having means for supporting said pairs of pawls on the respective sides thereof, said driving member having a part arranged to engage the rearward pawl of each pair of pawls and move the same into an inoperative position and to cause power to be transmitted through the rearward pawls to the forward pawls and the driven members.

14. The combination with toothed members rotatable about a common axis and each having a ratchet wheel near the inner end thereof, and a driving member mounted on one of said driven members for rotation relatively thereto, a pawl supporting device mounted on said driven members between the two ratchet wheels, a pair of oppositely extending pawls mounted on each side of said supporting member and held against bodily movement relatively thereto, said pawls being separately movable toward and away from the respective ratchet wheels, and each of said pawls having an outwardly extending projection, said driving member having parts arranged on opposite sides of the projection of said pawls, and so arranged that when movement is imparted to said driving member one of said parts will engage the projections of the rearward pawls, move the same out of engagement with the respective ratchet wheels, and will cause power to be transmitted through said rearward pawls to the forward pawls and said driven members.

15. The combination with toothed driven members rotatable about a common axis and each having a ratchet wheel near the inner end thereof, and a driving member mounted on one of said driven members for rotation relatively thereto, a pawl supporting device mounted on said driven members between the two rotatable wheels, a pair of oppositevly extending pawls mounted on each side of said supporting member and held against bodily movement relatively thereto, said pawls being separately movable toward and away from the respective ratchet wheels, and each of said pawls having an outwardly extending projection, said driving member having parts arranged on opposite sides of the projections of said pawls and so arranged that when movement is imparted to said driving member one of said parts will engage the projections of the rearward pawls, move the same out of engagement with the respective ratchet wheels, and will cause power to be transmitted through said rearward pawls to the forward pawls and said driven members, and means to resist the movement of said pawl supporting device relatively to said driven members.

16. The combination with a driven member and a driving member, of a pair of oppositely arranged pawls connected one to the other and separately movable toward and from said driven members, each of said pawls having projections near the respective ends thereof, and said driving member having parts arranged adjacent to the respective pawls to engage one of said projections to move the pawl about its axis and to cause the other projection to be moved into engagement with said part.

17. The combination with a driven member and a driving member having inwardly extending projections spaced apart, of a pair of oppositely arranged pawls mounted on a common axis adjacent to said driven member and having projections extending into the space between the projections on said driving member, whereby the movement of said driving member in either direction will cause the rearward pawl to be moved into an inoperative position.

18. The combination with a driven member and a driving member having inwardly extending projections spaced apart, of a pair of oppositely arranged pawls mounted on a common axis adjacent to said driven member and having projections extending into the space between the projections on said driving member, whereby the movement of said driving member in either direction will cause the rearward pawl to be moved into an inoperative position, a connection between said pawls, and means to limit the pivotal movement of the rearward pawl by said driving member, whereby power will be transmitted through said rearward pawl and said connection to the forward pawl and the driven member.

19. The combination with an axle, means for rotating the same, a wheel mounted for rotation relatively to said axle, and a toothed member connected with said wheel, of a pair of oppositely extending pawls supported adjacent to the toothed member of said wheel, and a part carried by said axle to engage the rearward pawl, move the same into an inoperative position and cause power to be transmitted to the forward pawl and said wheel.

20. The combination with a one piece axle, means for rotating the same, a wheel mounted near each end of said axle for rotation relatively thereto, and a toothed member connected with said wheel, of a pawl supporting device, a pair of oppositely arranged pawls carried by said supporting device near each end of said axle and arranged to coöperate with the toothed members of the respective wheels, and a disk-like structure rigidly secured to each end of said axle, each of said structures having a portion overhanging the respective pawls and adapted to engage the rearward pawl, move said pawl into an inoperative position and to cause the forward pawl to actuate said wheel.

In testimony whereof, I affix my signature hereto.

ISAAC S. DEMENT.